United States Patent [19]

Embree et al.

[11] 4,087,647
[45] May 2, 1978

[54] CIRCUIT FOR SUPPLYING DIRECT CURRENT TO TELEPHONE STATION SETS

[75] Inventors: Milton Luther Embree, Reading, Pa.; John Francis O'Neill, Boulder, Colo.

[73] Assignee: Bell Telephone Laboratories, Incorporated, Murray Hill, N.J.

[21] Appl. No.: 800,220

[22] Filed: May 25, 1977

[51] Int. Cl.² .......................................... H04M 19/08
[52] U.S. Cl. .................................. 179/77; 179/18 FA
[58] Field of Search ............... 179/77, 18 F, 18 FA, 179/18 HB, 81 R, 81 A, 84 R, 84 A, 16 R, 16 A, 16 AA, 16 F, 99, 23

[56] References Cited

U.S. PATENT DOCUMENTS

| | | | |
|---|---|---|---|
| 3,649,769 | 3/1972 | Pest | 179/77 |
| 3,940,572 | 2/1976 | Burgess | 179/77 |
| 3,955,052 | 5/1976 | Orbach | 179/18 FA |
| 4,007,335 | 2/1977 | Hetherington et al. | 179/16 AA |

FOREIGN PATENT DOCUMENTS

| | | | |
|---|---|---|---|
| 2,254,168 | 12/1973 | France | 179/77 |
| 2,279,287 | 7/1974 | France | 179/77 |
| 1,290,202 | 3/1969 | Germany | 179/77 |
| 1,762,838 | 10/1970 | Germany | 179/77 |

Primary Examiner—Thomas A. Robinson
Attorney, Agent, or Firm—H. W. Lockhart

[57] ABSTRACT

A local battery feed circuit for telephone station sets comprises two half circuit portions substantially symmetric about an imaginary line midway between the TIP and RING telephone lines. Each half circuit includes a current drive amplifier including a pair of up-down emitter follower transistors and a driver transistor. A coupling capacitor and matched resistors provide common mode interference reduction without degrading differential mode signals. Power supply noise is substantially eliminated by transistors in each half circuit arranged to produce an a.c. current equal and opposite to that generated from the power source.

10 Claims, 1 Drawing Figure

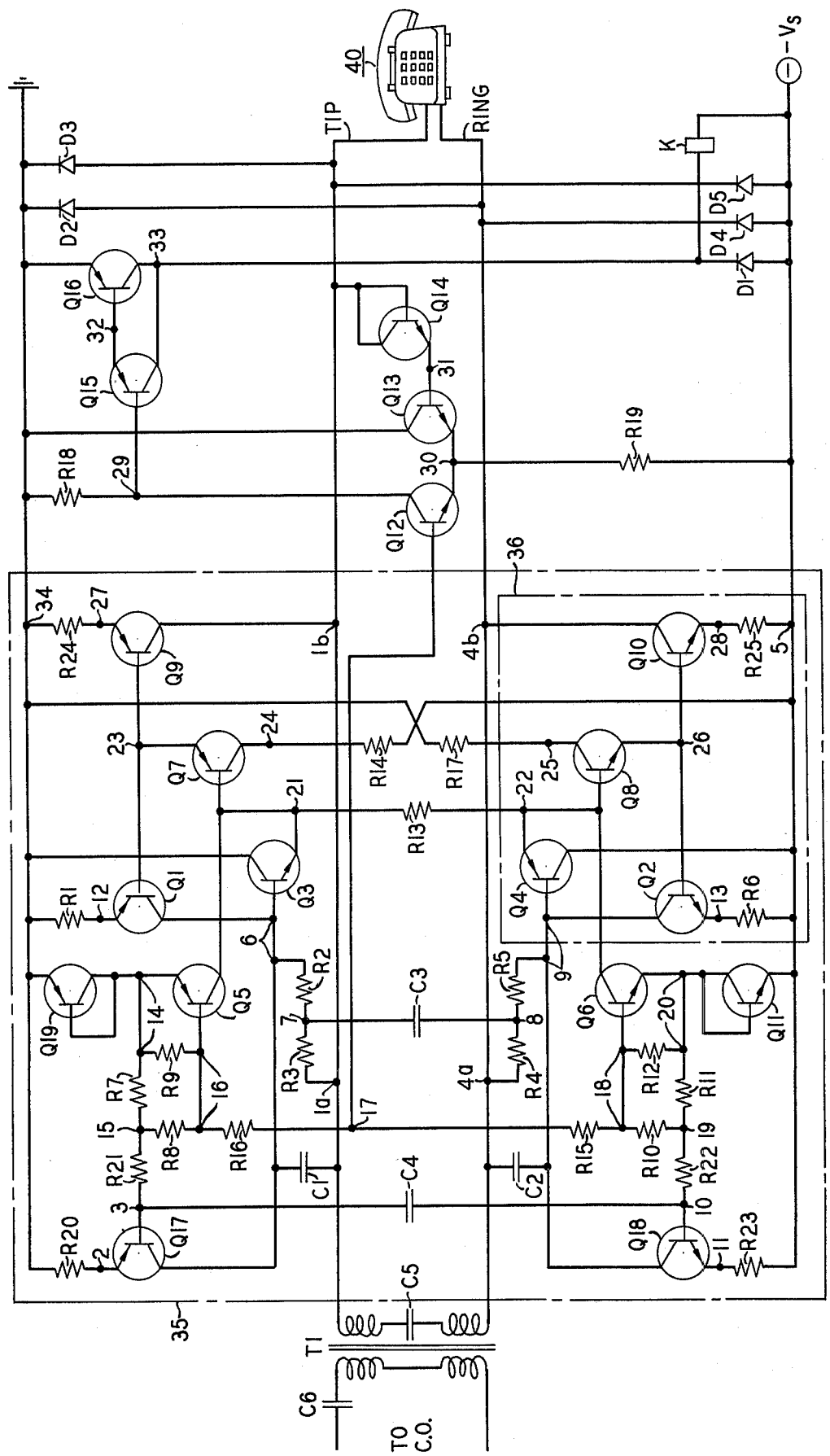

CIRCUIT FOR SUPPLYING DIRECT CURRENT TO TELEPHONE STATION SETS

BACKGROUND OF THE INVENTION

This invention relates to telephone line circuits and particularly to a battery feed circuit for a telephone line having a plurality of stations.

In a telephone subscriber loop arrangement comprising a plurality of telephone stations, d.c. voltage for powering transmitter microphones and for various signaling generally is often supplied locally. There is a need, in all types of telephone circuits, to reduce noise signals induced in the telephone line, characteristically common mode signals, without degrading differential mode talking signals. Interference both from local crosstalk and the power supply are likely. Prior circuits utilized inductors to provide suitable power supply isolation and more recently electronic circuits have been disclosed for both common and local battery feed to telephone lines which avoid the inclusion of inductors. However, there is a continuing need for local battery feed arrangements which provide greater common mode interference reduction as well as elimination of locally produced noise. Moreover, it is desirable to implement a telephone line local battery feed circuit using solid state integrated circuit technology to the greatest possible extent.

SUMMARY OF THE INVENTION

In accordance with this invention, in one aspect, a battery feed circuit for a key telephone system accomplishes reduction of common mode signals and substantial elimination of local power supply noise while supplying talking and signaling currents to the key telephone stations. The battery feed circuit comprises two half portions which are basically symmetric about an imaginary line midway between the TIP and RING telephone lines. The circuit is powered from a d.c. supply of local origin and basically comprises current drive amplifiers with voltage feedback from the load for both d.c. and common modes a.c. signals. Differential a.c., that is, voice feedback is prevented by the provision of a coupling capacitor and matched resistors which effectively maintain a high output impedance for the differential talking signals, and, at the same time, a low output impedance for common mode interference signals.

Noise, originating primarily in the power source, is substantially eliminated in each half circuit by generation of a cancelling a.c. current equal and opposite to that produced by a series pair of sensing resistors connected across the power supply noise source. The cancelling a.c. current is produced in each half circuit at the collector output of a transistor which is emitter-coupled by way of a resistance to the respective power source terminal in combination with a second coupling capacitor connecting the base electrodes of the two transistors, thus placing the base-emitter junctions of the transistors and associated resistors across the same noise source.

Implementation of the battery feed circuit in accordance with this invention is enhanced by complementary bipolar transistor technology because transistors in similar functional positions in the two halves of the circuit are of opposite conductivity types. Other features of the battery feed circuit, in addition to a bias system, include a temperature sensing, thermal shutdown arrangement for the TIP and RING current drive transistors.

BRIEF DESCRIPTION OF THE DRAWING

The local battery feed circuit for a telephone system in accordance with this invention will be better understood from the following more detailed description of the organization and operation of one illustrative embodiment taken in conjunction with the drawing which is a schematic circuit diagram thereof.

DETAILED DESCRIPTION

In the drawing there is shown a telephone line having two sides or wires denoted TIP and RING connected at the one end to a telephone subset 40 and terminating at the other end in a transformer T1 making coupling to the central office telephone line. C5 and C6 are conventional d.c. blocking capacitors. The telephone subset 40 generally is one of a plurality of telephone stations such as are interconnected in a key telephone system or a small PBX system.

The basic battery feed circuit is represented by the portion within the broken line boundary 35. This circuit portion 35, with the exception of capacitors C3 and C4 and resistors R24 and R25, advantageously may be implemented in a single silicon monolithic integrated circuit. The battery feed circuit 35 basically is symmetric about an imaginary line midway between TIP and RING bisecting, in effect, the elements C3, C4 and R13 which are common to both half circuits. As previously pointed out, corresponding transistors in the two half circuits are of opposite conductivity type. Such an arrangement of integrated complementary transistors advantageously may be implemented by the fabrication procedure disclosed in U.S. Pat. application Ser. No. 658,586 by W. E. Beadle, S. F. Moyer and A. A. Yiannoulos and commonly assigned. For purposes of explanation the RING side half circuit will be described and deviations therefrom in the TIP side half circuit, or element common to both, will be specifically noted. For a typical telephone system the circuit is powered from a negative 15 volt d.c. supply of local origin. Terminal 5 is adapted for connection to the −15V side of the power source, and terminal 34 in the tip half similarly connects to the other side, in this case, ground.

Resistors R4 and R5 couple the RING side of the line at node 4a to node 9 which may be characterized as an input to a current drive amplifier encompassed within the broken outline 36. Within the outline 36 transistors Q4 and Q8, which are of opposite conductivity type, constitute oppositely disposed emitter followers, referred to herein as up-down emitter followers. Current driver transistor Q10 is emitter coupled by way of R25 to power supply terminal 5 and has its collector output to the RING side of the line at node 4b. Transistor Q2 and R6 effect a feedback path for current generation from power terminal node 5 to input node 9.

R13 between node 21 and node 22, and common to both half circuits, is a current source resistor to supply base current to Q8 and serves also to keep Q4 turned on. R17 and its counterpart R14 in the TIP side half circuit are current limiting resistors. R14 is important in that its current limiting function inhibits a false off-hook detection condition which can occur with Q9 in saturation.

In connection with the local power supply function of this circuit, the difference in d.c. voltage between RING (node 4a–4b) and the −15V supply (node 5) causes a voltage drop across R4 and R5 which results in a current flow into input node 9. This raises the potential at node 9, and by the up-down emitter follower action of transistors Q4 and Q8, the potential at the base of Q10 (node 26) is correspondingly increased. The current driver or power transistor Q10 likewise is an emitter follower so its emitter potential increases correspondingly, resulting in a sizable current flow through the relatively low resistance of R25. This is reflected in a sizable collector output current of Q10 which, accordingly, is the desired d.c. telephone supply current.

Raising the potential at node 26 also raises the potential at the base of Q2 and, because it also is an emitter follower, its emitter potential increases and a small current is established through the relatively large resistance of R6. This determined the collector current of Q2 which will be equal approximately to the current flowing into input node 9 from resistors R4 and R5 because the base current of Q4 is very small.

Since the potentials at nodes 13 and 28 are about equal, the telephone current, in the collector of Q10, is approximately equal to the current flowing into node 9 multiplied by the ratio of the resistance of R6 to that of R25. Also, since the potentials at nodes 9 and 26 are about equal, the potential at node 9 with respect to the negative supply terminal, node 5, is the telephone current (collector output of Q10) multiplied by R25 plus the $V_{BE}$ of Q10 which is relatively constant. Combining the above relations, the following equation for telephone current in terms of RING line voltage, supply voltage, and component values is determined.

$$I_{phone} = \frac{V_{RING} - V_{supply} - V_{BE(Q10)}}{R25} \times \frac{R6}{R4 + R5 + R6} \quad (1)$$

This is a particularly advantageous relationship for solid-state integration because the telephone current is dependent only on the telephone d.c. characteristics, the supply voltage, the base-emitter drop of a transistor, a ratio of resistors and the size of a simple resistor, R25. Because R25 has the full phone current flowing in it, it is advantageous to make this resistor, and its counterpart R24, discrete to reduce power dissipation in the monolithic integrated circuit. As a discrete element, the absolute value of these resistors also economically can have a small tolerance, for example, 1 percent.

From the standpoint of a.c. operation, capacitor C3 effectively shorts node 8 to ground for differential signals and has no effect on common mode signals. For the common mode case, the shunting impedance to ground for the RING side of the line, by partial differentiation of equation (1) is:

$$R_O = \frac{R25(R4 + R5 + R6)}{R6} \quad (2)$$

For differential signals, the TIP to RING shunting impedance is the parallel combination of the direct shunting path formed by R4, C3 and the corresponding TIP side resistor, R3; and the shunting path formed by the output impedance of Q10 in series with the output impedance of its counterpart Q9. For differential signals driver transistors Q9 and Q10 are effectively controlled through their bases by the very low output impedance of the up-down emitter followers. As a result, the output impedance of these transistors is directly relatable to their Early voltage and beta as follows:

$$r_O = \frac{(1 + \beta) V_A (\frac{V_T}{I_E} + R_E)}{R_E I_E + (1 + \beta) V_T} \quad (3)$$

Where: $r_o$ is the in-circuit transistor output impedance; beta is the transistor common emitter current gain, $V_A$ is the transistor Early voltage, $I_E$ is the transistor d.c. emitter current, $R_E$ is the external emitter resistor and, $V_T$ is the transistor temperature characteristic voltage ($V_T$ = KT/q).

Referring again to the RING side half circuit, resistances R15, R10, R11 and R12 and diode connected transistor Q11 provide a bias network for establishing a reference voltage across the base-emitter of Q6. The collector of Q6 is connected to node 22 representing the emitter-base common terminal of the up-down emitter follower. Transistor Q6 is located on the monolithic integrated circuit very close to driver transistor Q10 so as to effectively sense the temperature of Q10 whenever high power dissipation occurs, as for example, during a severe fault condition resulting from, for example, craftsman error during installation or repair work. At normal operating temperatures the collector current of Q6 is extremely small and has no effect on circuit operation. However, when the emitter-base junction temperature of Q6 reaches about 150° C, sizable collector current results in Q6 and the current available to the up-down emitter follower is reduced. At about 160° C the collector current in Q6 reaches a level which substantially depletes the emitter followers Q4 and Q8 and results in circuit shutdown. Because the current required for satisfactory operation of the emitter follower is a small fraction of the available current, thermal shutdown occurs over a small temperature range.

Although as indicated above, common mode interference is suppressed, particularly by the coupling capacitor C3 and associated resistors, troublesome noise resulting from the power supply must be prevented from entering the telephone line. This is accomplished chiefly by the noise cancellation transistors Q17 and Q18. Since the battery feed circuit is symmetrical, it is convenient to assume two equal voltage noise generators, one in series with the negative supply and one in series with ground. Under these circumstances the line of circuit symmetry is at a.c. ground, that is, midway between TIP and RING. If an a.c. current is injected into input node 9 to provide complete power supply noise cancellation, the a.c. current (noise) in Q10 will be zero and the a.c. voltage across R25 likewise will be zero. By emitter follower action, the a.c. voltage between nodes 28 and 9 is zero. Because C3 shorts node 8 to a.c. ground, midway between TIP and RING, the full noise generator voltage in series with the negative supply is effectively applied across R5. As a result, the noise current flowing into node 9 from R5 is:

$$i_{NOISE(R5)} = \frac{\frac{V_{S(AC)}}{2}}{R5} \quad (4)$$

where $V_{S(AC)}$ is the power supply noise voltage. The term $i_{NOISE(R5)}$ is the value of the current which must be injected into node 9 in order to achieve power supply noise cancellation. For this purpose transistor Q18 is arranged to provide the required noise cancellation current. Transistor Q18 has its emitter connected by way of resistor R23 to power supply terminal 5, and its collector directly connected to node 9. The base of Q18 is connected for a.c. signals by way of capacitor C4 to the base of its counterpart transistor Q17. Thus, half of the power supply noise is applied across the emitter-base junction of the noise cancellation transistor Q17 and coupling resistor R20 and the other half across the emitter-base junction of Q18 and R23, or in other words, half each between nodes 3 and 34 and nodes 5 and 10. Consequently, the a.c. collector currents are:

$$i_{NOISE(Q18\ COL)} = \frac{\frac{V_{S(AC)}}{2}}{R23 + r_{eQ18}} \quad (5)$$

$$i_{NOISE(Q17\ COL)} = \frac{\frac{V_{S(AC)}}{2}}{R20 + r_{eQ17}} \quad (6)$$

where $r_e$ is the a.c. resistance of the emitter-base junction ($r_e = V_T/I_E$). Equating noise currents, the required resistor relationship for power supply noise cancellations are:

$$R5 = R23 + r_{eQ18} \quad (7)$$

$$R3 = R20 + r_{eQ17} \quad (8)$$

Capacitors C1 and C2 connecting the input nodes of the current amplifiers to the telephone line and in parallel with the feedback resistors provide stabilization of the circuits.

With reference to portions of the circuit shown outside of the broken line boundary 35 denoting the battery feed circuit, transistors Q12, Q13 and diode connected transistor Q14 constitute a portion of a comparator circuit for dial pulse and off-hook detection. The entire detection circuit includes also Darlington pair transistors Q15 and Q16 and resistors R18 and R19. This current configuration detects the voltage on the TIP telephone line and operates a relay K when this voltage is less than a prescribed value, in a typical system about −1.5 volts.

Diode D1 protects the battery feed circuit from relay kickback transients when Q15 and Q16 turn off. Diodes D2, D3, D4 and D5 protect the battery feed circuit from induced transient currents coming in on the telephone line. It will be understood that although only a single telephone set 40 is shown, a plurality of station sets may be provided, all supplied with d.c. power by the same feed circuit as described herein.

In an illustrative embodiment, the battery feed circuit and associated circuitry as described herein was constructed in which the various elements have the following values:

| R1 | 60K ohms | R14 | 4.0K ohms |
|----|----------|-----|-----------|
| R2 | 22K ohms | R15 | 68K ohms |
| R3 | 25K ohms | R16 | 5.6K ohms |
| R4 | 25K ohms | R17 | 4K ohms |
| R5 | 22K ohms | R18 | 25K ohms |
| R6 | 60K ohms | R19 | 50K ohms |
| R7 | 4.88K ohms | R20 | 19K ohms |
| R8 | 4.44K ohms | R21 | 20K ohms |
| R9 | 3.11K ohms | R22 | 20K ohms |
| R10 | 4.0K ohms | R23 | 18.5K ohms |
| R11 | 4.88K ohms | R24 | 47 ohms |
| R12 | 2.96K ohms | R25 | 47 ohms |
| R13 | 80K ohms | | |
| C1 | 1 picofarad | | |
| C2 | 1 picofarad | | |
| C3 | 10 microfarad | | |
| C4 | 1 microfarad | | |

*-continued*

| C5 | 2 microfarad |
|----|--------------|
| C6 | 2 microfarad |

Inserting the foregoing values into equation (2), the common mode shunting impedance to ground has the low value of 84 ohms. For example, for a driver transistor having an Early voltage of 40 volts, equation (3) yields an output impedance of 26,800 ohms. For the noise cancellation circuit, in accordance with the above specific embodiment, the d.c. operating points of Q17 and Q18 are at about 10 microamperes so that relatively large power supply noise voltages, up to about 400 millivolts, can be tolerated.

Thus, in the battery feed circuit herein described, the complementary, high current gain, current drive amplifiers advantageously use high gain, high current, vertical pnp transistors realizable by means of the procedures described in the aforementioned application of Beadle-Moyer-Yiannoulos. These amplifier circuits use up-down emitter followers to achieve high current gain without significant d.c. level shift. In addition, the Q2-R6 and Q1-R1 circuit arrangements provide current feedback to reduce the base drive impedances of the driver transistors Q9 and Q10 to very low values, thus enhancing the collector output impedance of these transistors.

The use of the cross circuit capacitor C3, which is connected, effectively, to a.c. ground, and feedback resistors R3 and R4 to form a filter in the feedback circuit eliminates differential feedback signals while having no effect on common mode (longitudinal) signals. As a result, the battery feed circuit provides a low impedance shunt to ground for longitudinal noise currents induced in the telephone line. At the same time, a very high differential shunting impedance is maintained.

This form of coupling is advantageous for these purposes not only in this specific embodiment, but in connection with any pair of communication lines which are being fed by separate driver circuits. It will be appreciated that R2 and R5 are provided in connection with the noise cancellation function and that, in the absence of that function, the cross circuit capacitor C3 would be connected directly to the input nodes 6 and 9.

Finally, a power supply noise cancellation system requires only a single large capacitors (C3) to be provided in addition to the elements incorporated in the monolithic integrated circuit in the illustrative embodiment. This configuration achieves a power supply rejection improvement of over 30 dB and makes an otherwise unsatisfactory circuit suitable for telephone applications.

What is claimed is:

1. In a telephone system a line circuit comprising a pair of conductors, a pair of amplifier circuits each having an input node and being connected to a different one of said conductors by means of an output coupling and an input coupling, each said input coupling including a resistive element between said conductor and said input node, and capacitive coupling means connecting said input nodes.

2. A telephone system in accordance with claim 1 in which said amplifier circuits are substantially identical and which contain counterpart transistors in corresponding locations in each circuit, said counterpart transistors being of opposite conductivity type in each amplifier respectively.

3. A current driver amplifier including an input node, an output node and a power terminal, a pair of complementary transistors connected in up-down emitter follower configuration, a current driver transistor and a feedback transistor.

4. In a communication system a current driver amplifier in accordance with claim 3 in which said input node is connected to the base electrode of one of said up-down emitter follower transistors, the collector electrode of said driver transistor is connected to said output node, and the collector electrode of said feedback transistor is connected to said input node.

5. In a communication system, a current driver amplifier including an input node, an output node, and a power terminal, a first transistor of one conductivity type, second, third and fourth transistors of opposite conductivity type, in which the base electrode of the first transistor is connected to the input node, the emitter electrode of the first transistor is connected to the base electrode of the second transistor and the collector electrode of the first transistor is directly connected to the power terminal, and further in which the emitter electrode of the second transistor is connected to the base electrodes of the third and fourth transistors, the emitter electrodes of the third and fourth transistors are resistively coupled to the power terminal, the collector electrode of the third transistor being connected to the output node and the collector electrode of the fourth transistor being connected to the input node.

6. A power supply system for a local telephone line circuit comprising
(1) a telephone line circuit including a TIP conductor and a RING conductor,
(2) a first circuit connected between one terminal of a direct current source and one conductor of said telephone line circuit,
(3) a second circuit connected between the other terminal of a direct current source and the other conductor of said telephone line circuit,
(4) said first and said second circuit each including:
 (a) a current drive amplifier having an input node and a driver transistor,
 (b) an output coupling between said driver transistor and one of said telephone lines, and
 (c) resistive feedback coupling between said one telephone line and said input node, and
(5) capacitive connecting means between said input nodes.

7. A power supply system for a local telephone line circuit comprising (1) a telephone line circuit including a TIP conductor and a RING conductor,
(2) a first circuit connected between one terminal of a direct current source and one conductor of said telephone line circuit,
(3) a second circuit connected between the other terminal of a direct current source and the other conductor of said telephone line circuit,
(4) said first and said second circuit each including:
 (a) a current drive amplifier having an input node and a driver transistor,
 (b) an output coupling between said driver transistor and one of said telephone lines, and
 (c) a resistive feedback coupling between said one telephone line and said input node,
(5) first capacitive connecting means between intermediate nodes located in said feedback couplings respectively,
(6) said first and said second circuits each including power supply noise cancellation means for injecting a noise cancelling current at each input node, said means including a noise cancellation transistor, and
(7) second capacitive connecting means between the base electrodes of said noise cancellation transistors.

8. A power supply system in accordance with claim 7, in which each said current drive amplifier includes an input node, an output node, and a power terminal, a first transistor of one conductivity type, second, third and fourth transistors of opposite conductivity type, in which the base electrode of the first transistor is connected to the input node, the emitter electrode of the first transistor is connected to the base electrode of the first transistor is directly connected to the power terminal, and further in which the emitter electrode of the second transistor is connected to the base electrodes of the third and fourth transistors, the emitter electrodes of the third and fourth transistors are respectively coupled to the power terminal, the collector electrode of the third transistor being connected to the output node and the collector electrode of the fourth transistor being connected to the input node.

9. A power supply system in accordance with claim 7 in which each noise cancellation transistor has its emitter electrode resistively coupled to its associated power source terminal.

10. A power supply system in accordance with claim 7 in which said first and second circuits include transistors in corresponding circuit positions, the transistors in said second circuit being of opposite conductivity type to the corresponding transistors in said first circuit.

* * * * *

Disclaimer 4,087,647.—*Milton Luther Embree*, Reading, Pa. and *John Francis O'Neill*, Boulder, Colo. CIRCUIT FOR SUPPLYING DIRECT CURRENT TO TELEPHONE STATION SETS. Patent dated May 2, 1978. Disclaimer filed Mar. 17, 1981, by the assignee, *Bell Telephone Laboratories, Inc.*

Hereby enters this disclaimer to claims 1 and 2 of said patent.
[*Official Gazette May 12, 1981.*]